United States Patent
Rock

(10) Patent No.: US 6,699,614 B2
(45) Date of Patent: Mar. 2, 2004

(54) CONVERGING/DIVERGING FLOW CHANNELS FOR FUEL CELL

(75) Inventor: Jeffrey Allan Rock, Rochester, NY (US)

(73) Assignee: General Motors Corporation, Detroit, MI (US)

(*) Notice: Subject to any disclaimer, the term of this patent is extended or adjusted under 35 U.S.C. 154(b) by 46 days.

(21) Appl. No.: 10/100,460

(22) Filed: Mar. 18, 2002

(65) Prior Publication Data

US 2003/0175577 A1 Sep. 18, 2003

(51) Int. Cl.$^7$ .................................................. H01M 2/14
(52) U.S. Cl. .............................. 429/39; 429/38; 429/34; 429/12
(58) Field of Search .............................. 429/39, 38, 34, 429/12, 30

(56) References Cited

U.S. PATENT DOCUMENTS

| | | | |
|---|---|---|---|
| 3,134,697 A | 5/1964 | Niedrach | 136/86 |
| 5,272,017 A | 12/1993 | Swathirajan et al. | 429/33 |
| 6,099,984 A | 8/2000 | Rock | 429/39 |
| 6,309,773 B1 * | 10/2001 | Rock | 429/34 |

OTHER PUBLICATIONS

"Recent Advances in Solid Polymer Electrolyte Fuel Cell Technology with Low Platinum Loading Electrodes" Supramaniam Srinivasan, David J. Manko, Hermann Koch, Mohammad A. Enayetullah and A. John Appleby, Journal of Power Sources, 29 (1990) pp. 367–387.

* cited by examiner

Primary Examiner—Patrick Ryan
Assistant Examiner—Angela J Martin
(74) Attorney, Agent, or Firm—Cary W. Brooks

(57) ABSTRACT

A PEM fuel cell having serpentine flow field channels each having an inlet leg, an exit leg, at least one medial leg therebetween, and hairpin curved ends connecting the medial leg(s) to other legs of the sector. Each leg is separated from the next by a tapering land so that it converges/diverges on/from the next adjacent leg (i.e. its longitudinal centerline intersects the longitudinal centerline of an adjacent leg).

3 Claims, 6 Drawing Sheets

CONVERGING/DIVERGING FLOW CHANNELS FOR FUEL CELL

TECHNICAL FIELD

This invention relates to PEM fuel cells and more particularly to the reactant flow fields therefor.

BACKGROUND OF THE INVENTION

Fuel cells have been proposed as a power source for many applications. One well known such fuel cell is the PEM (i.e., proton exchange membrane) fuel cell. PEM fuel cells include, in each cell thereof, a so-called "membrane-electrode-assembly" (hereafter MEA) comprising a thin (i.e., ca. 0.0015–0.007 inch), proton-conductive, polymeric, membrane-electrolyte having an anode electrode film (i.e., ca. 0.002 inch) formed on one face thereof, and a cathode electrode film (i.e., ca. 0.002 inch) formed on the opposite face thereof. Such membrane-electrolytes are well known in the art and are described in such as U.S. Pat. Nos. 5,272,017 and 3,134,697, as well as in the Journal of Power Sources, Volume 29 (1990) pages 367–387, inter alia. In general, such membrane-electrolytes are made from ion-exchange resins, and typically comprise a perfluoronated sulfonic acid polymer (e.g. NAFION™ from DuPont). The anode and cathode films, on the other hand, typically comprise (1) finely divided carbon particles, very finely divided catalytic particles supported on the carbon particles, and proton conductive material (e.g., NAFION™) intermingled with the catalytic and carbon particles, or (2) catalytic particles, sans carbon, dispersed throughout a polytetrafluoroethylene (PTFE) binder. One such MEA and fuel cell is described in U.S. Pat. No. 5,272,017 issued Dec. 21, 1993, and assigned to the assignee of the present invention.

The MEA is sandwiched between sheets of porous, gas-permeable, conductive material, known as a "diffusion layer", which press against the anode and cathode faces of the MEA and serve as (1) the primary current collectors for the anode and cathode, and (2) mechanical support for the MEA. Suitable such primary current collector sheets comprise carbon or graphite paper or cloth, fine mesh noble metal screen, and the like, through which the gas can move to contact the MEA, as is well known in the art.

The thusly formed sandwich is pressed between a pair of electrically conductive plates which serve as secondary current collectors for collecting the current from the primary current collectors and together define a single cell. A plurality of abutting cells define a fuel cell stack. The plates conduct current between adjacent cells (i.e., in the case of bipolar plates) internally of the stack, and externally of the stack in the case of monopolar plates at the ends of the stack. The secondary current collecting plates each contain at least one so-called "flow field" that distributes the fuel cell's gaseous reactants (e.g., $H_2$ and $O_2$/air) over the surfaces of the anode and cathode. The flow field includes a plurality of lands which engage the primary current collector and define therebetween a plurality of flow channels through which the gaseous reactants flow between a supply manifold at one end of a flow channel and an exhaust manifold at the other end of the channel. Serpentine flow channels are known and connect the supply and exhaust manifolds only after having made a number of hairpin turns and switch backs such that each leg of each serpentine flow channel borders at least one other leg of the same serpentine flow channel (e.g., see U.S. Pat. No. 6,099,984).

The pressure drop between the supply manifold and the exhaust manifold is of considerable importance in designing a fuel cell. One of the ways of providing a desirable pressure drop is to vary the length of the flow channels extending between the supply and exhaust manifolds. Serpentine channels have been used heretofore to vary the length of the flow channels. Serpentine channels are designed to allow some limited trans-land gas movement between adjacent legs of the same channel via the diffusion layer so as to expose the MEA confronting the land separating the legs to reactant. In this regard, gas can flow from an upstream leg of the channel (i.e. where pressure is higher) to a downstream leg of the same channel (i.e. where gas pressure is lower) by moving through the diffusion layer over/under the land that separates the upstream leg from the downstream leg of the flow channel. However, when the legs of a channel are long, an excessive pressure drop can occur between adjacent legs of the same flow channel. Such excessive pressure drop can, in turn, result in the gaseous reactant excessively short circuiting between the adjacent legs, rather than flowing through the full length of the channel. Such trans-land movement of gas between adjacent legs is considered to be excessive when it exceeds the amount of reactant that can be reacted on the MEA confronting the land between the legs.

SUMMARY OF THE INVENTION

The present invention provides a flow channel configuration reduces short-circuiting of the reactant gases between adjacent legs of the same channel. The present invention overcomes the aforesaid trans-land short-circuiting problem by providing a flow field having flow channels with non-parallel legs the longitudinal centerlines of which converge/diverge from each other such that the centerlines of adjacent legs intersect each other outboard the channels. More specifically, the present invention is an improvement to PEM fuel cells of the general type which comprise (1) a proton exchange membrane having opposing cathode and anode faces on opposite sides thereof, (2) a gas-permeable, electrically-conductive cathode current collector engaging the cathode face, (3) a gas-permeable electrically-conductive anode current collector engaging the anode face, and (4) a current-collecting plate engaging at least one of the gas-permeable collectors and defining a gas flow field that confronts that gas-permeable collector. The improvement is applicable to flow fields that comprise a plurality of lands that engage the current collector and define a plurality of gas flow channels, each of which comprises at least one serpentine sector flow-communicating a gas supply manifold with a gas exhaust manifold. Each sector has: an inlet leg for receiving gas into the sector at a first pressure; an exit leg for exhausting from said sector at a second pressure that is less than the first pressure; and at least one medial leg intermediate the inlet and exit legs. Several medial legs may be used to increase the pressure drop from one end of a channel to the other. The inlet, exit and medial leg(s) for each channel are separated by a tapering land so that each leg has a longitudinal centerline that intersects the longitudinal centerline of a next adjacent leg of the same channel. A reverse turn (e.g. hairpin curve) in the channel at each end of the medial leg(s) connects the medial leg(s) to adjacent legs of the same channel. Flow fields in accordance with the present invention may include a single such sector, or a plurality of such sectors serially arranged in the general direction extending between the supply and exhaust manifolds.

BRIEF DESCRIPTION OF THE DRAWINGS

The invention will be better understood when considered in the light of the following detailed description of specific embodiments thereof which are described hereinafter in conjunction with the several figures in which.

DESCRIPTION OF THE PREFERRED EMBODIMENT

Figure 1:
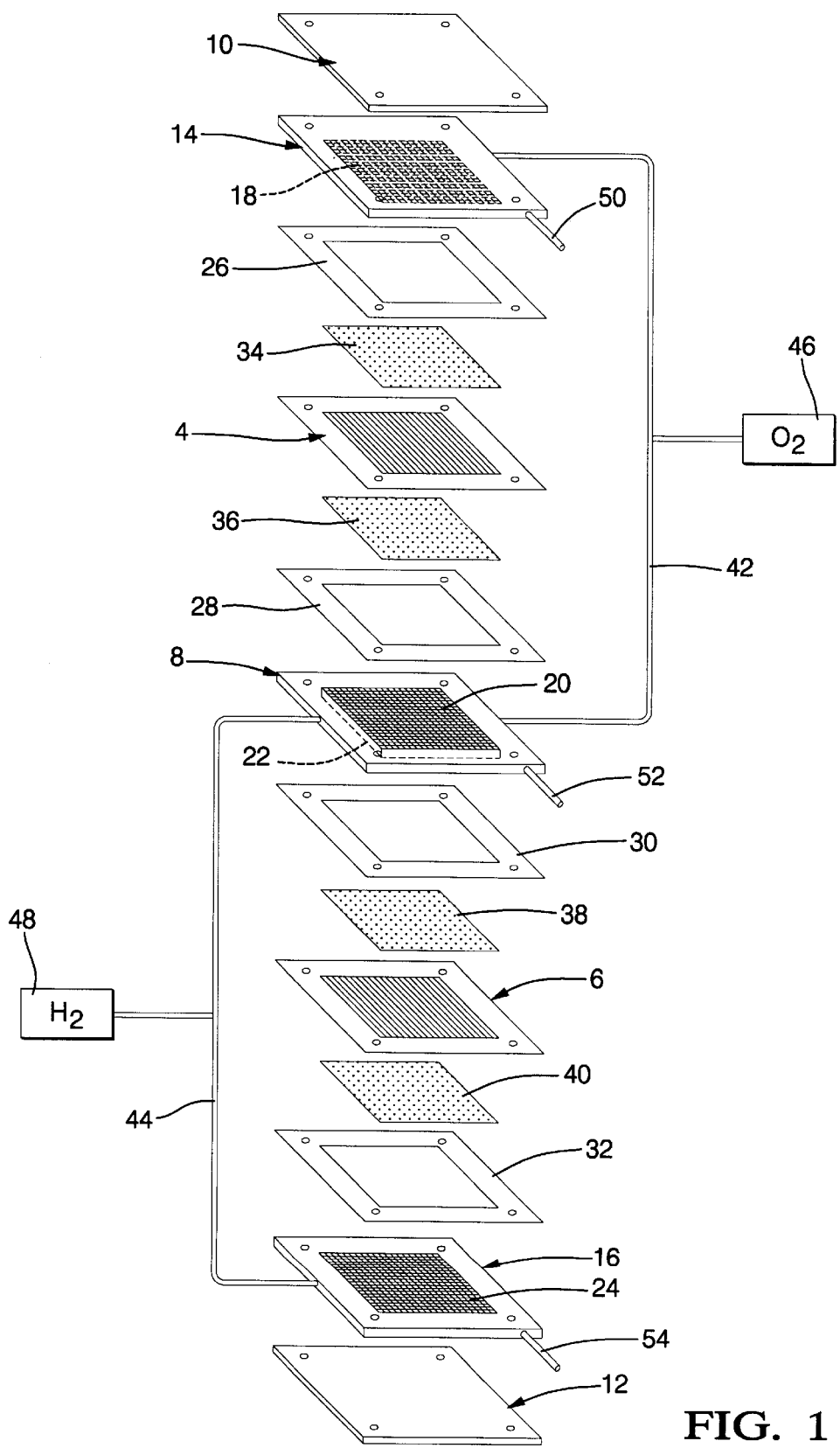
FIG. 1 is a schematic, isometric, exploded illustration of a PEM fuel cell.

FIG. 1 depicts a two cell, bipolar, PEM fuel cell stack having a pair of membrane-electrode-assemblies (MEAs) 4 and 6 separated from each other by an electrically conductive, liquid-cooled, bipolar plate 8. The MEAs 4 and 6, and bipolar plate 8, are stacked together between stainless steel clamping plates 10 and 12, and monopolar end contact plates 14 and 16. The monopolar end contact plates 14 and 16, as well as the bipolar plate 8, each contain flow fields 18, 20, 22 and 24 comprising a plurality of flow channels formed in the faces of the plates for distributing fuel and oxidant gases (i.e., $H_2$ & $O_2$) to the anode and cathode faces of the MEAs 4 and 6. Nonconductive gaskets 26, 28, 30, and 32 provide seals and electrical insulation between the several plates of the fuel cell stack. Porous, gas permeable, electrically conductive sheets 34, 36, 38 and 40, known as diffusion layers, press up against the electrode faces of the MEAs 4 and 6 and serve as primary current collectors for the electrodes as well as mechanical supports for the MEAs, especially at locations where the MEAs 4 and 6 span flow channels in the flow field and are otherwise unsupported. Suitable primary current collectors include carbon/graphite paper/cloth, fine mesh noble metal screens, open cell noble metal foams, and the like which conduct current from the electrodes while allowing gas to pass therethrough to react on the electrodes. The end contact elements 14 and 16 press up against the primary current collectors 34 and 40 respectively, while the bipolar plate 8 presses up against the primary current collector 36 on the anode face of MEA 4, and against the primary current collector 38 on the cathode face of MEA 6. Oxygen may be supplied to the cathode side of the fuel cell stack from a storage tank 46 via appropriate supply plumbing 42, while hydrogen may be supplied to the anode side of the fuel cell from a storage tank 48, via appropriate supply plumbing 44. Preferably, the $O_2$ tank 46 is eliminated and air is supplied to the cathode side from the ambient. Similarly, the $H_2$ tank 48 may be eliminated and hydrogen supplied to the anode from a reformer or other form of fuel processor which catalytically generates hydrogen from methanol, methane or a liquid hydrocarbon (e.g., gasoline). Exhaust plumbing (not shown) for both the $H_2$ and $O_2$/air sides of the MEAs is also provided for removing $H_2$-depleted anode gas from the anode flow field and $O_2$-depleted cathode gas from the cathode flow field. Additional plumbing 50, 52 and 54 is provided for supplying liquid coolant to the bipolar plate 8 and end plates 14 and 16, as may be needed. Appropriate plumbing for exhausting coolant from the plate 8 and end plates 14 and 16 is also provided, but not shown.

Figure 2:
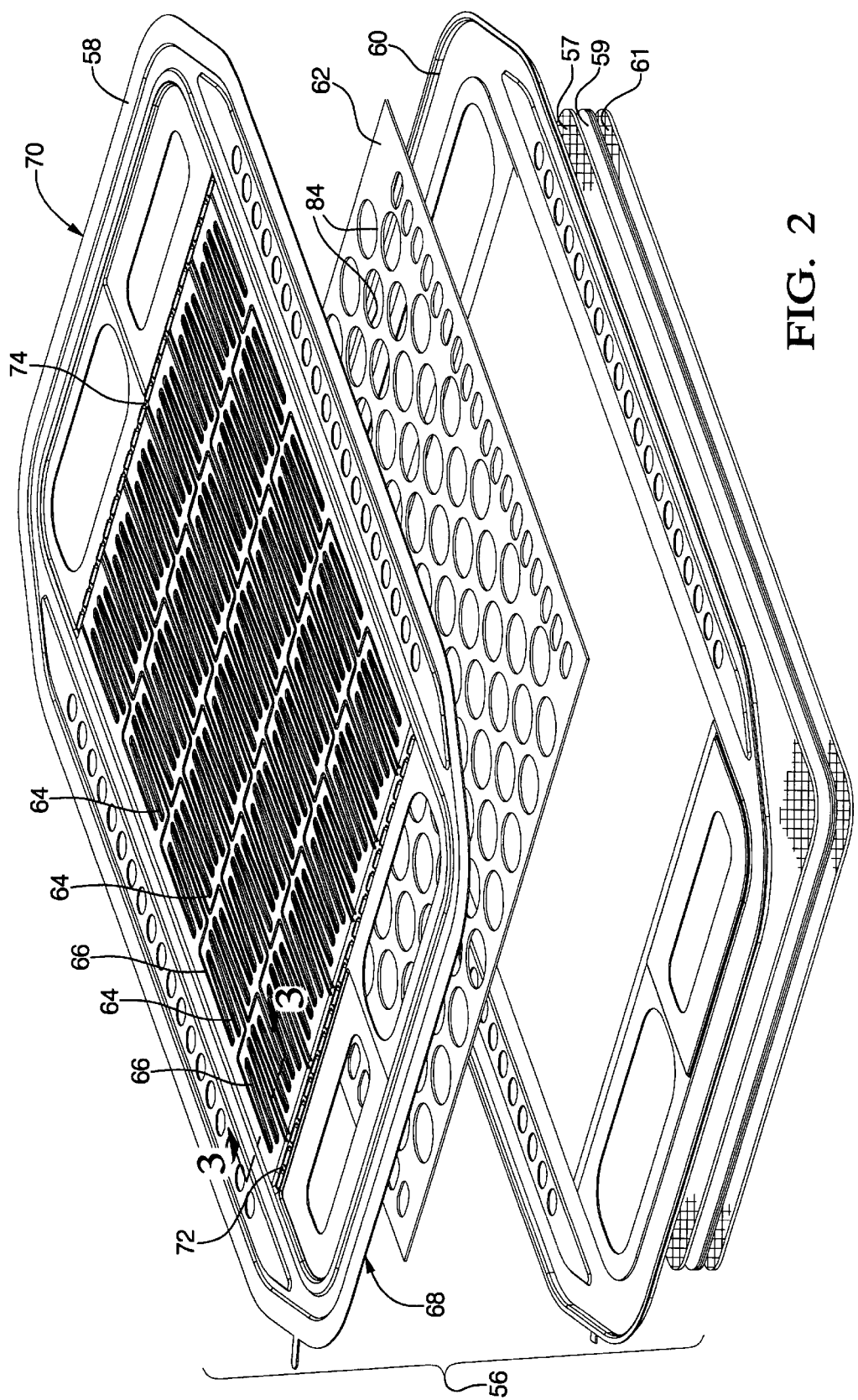
FIG. 2 is an isometric, exploded view of an MEA and bipolar plate having a flow-field according to the present invention.

FIG. 2 is an isometric, exploded view of a bipolar plate 56, first primary porous current collector 57, MEA 59 and second primary porous current collector 61 as they are stacked together in a fuel cell. A second bipolar plate (not shown) would underlie the second primary current collector 61 to form one complete cell. Similarly, another set of primary current collectors and MEA (not shown) will overlie the upper sheet 58. The bipolar plate 56 comprises a first exterior metal sheet 58, a second exterior metal sheet 60, and an optional interior spacer metal sheet 62 interjacent the first metal sheet 58 and the second metal sheet 60. The metal sheets 58, 60 and 62 are made as thin as possible (e.g., about 0.002–0.02 inches thick), may be formed by stamping, by photo etching (i.e., through a photolithographic mask) or any other conventional process for shaping sheet metal. The external sheet 58 is formed so as to provide a reactant gas flow field characterized by a plurality of tapering lands 64 which define therebetween a plurality of serpentine gas flow channels 66 through which the fuel cell's reactant gases (i.e., $H_2$ or $O_2$) flow in a tortuous path from near one edge 68 of the bipolar plate to near the opposite edge 70 thereof. When the fuel cell is fully assembled, the lands 64 press against the primary current collectors 61 which, in turn, press against the MEA 59. In operation, current flows from the primary current collector through the lands 64 and thence through the stack. The reactant gas is supplied to channels 66 from a header or supply manifold groove 72 that lies adjacent the edge 68 of the plate 56 at one end of the flow field, and exits the channels 66 via an exhaust manifold groove 74 that lies adjacent the opposite edge 70 of the fuel cell at the other end of the flow field. Alternatively the supply and exhaust manifolds could lie adjacent the same edge (i.e. 68 or 70) of the plate 56. The underside of the metal sheet 58 (not shown) is configured to allow coolant to flow thereacross during the operation of the fuel cell.

Metal sheet 60 is similar to sheet 58. The internal (i.e., coolant side) of sheet 60 is shown in FIG. 2, sans detail. The coolant sides of the sheets 58 and 60 define therebetween a thin chamber through which coolant flows from one edge 69 of the bipolar plate to the opposite edge 71. Like sheet 58, the external ((i.e. reactant) side (not shown) of the sheet 60 will have a plurality of tapering land thereon defining a plurality of channels (not shown) through which the reactant gases pass. A perforated interior metal spacer sheet 62 may be positioned interjacent the exterior sheets 58 and 60 and induces turbulent flow of coolant between the coolant-side of sheet 60 and the coolant-side of sheet 58 for more effective heat exchange with the inside faces of the exterior sheets 58 and 60 respectively. The several sheets 58, 60 and 62 are preferably brazed together.

Figure 3:
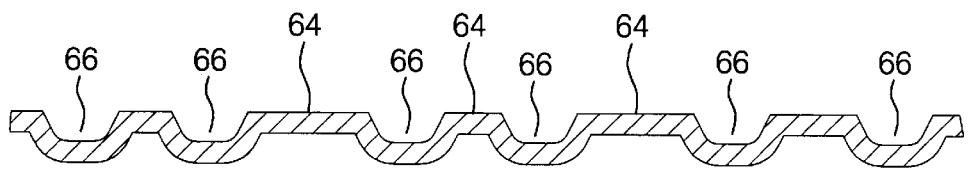
FIG. 3 is an enlarged sectional view in the direction 3—3 of FIG. 2.

FIG. 3 is a sectioned view in the direction 3—3 of the plate 58 of FIG. 2 showing the lands 64 that define the reactant flow channels 66.

Figure 5:
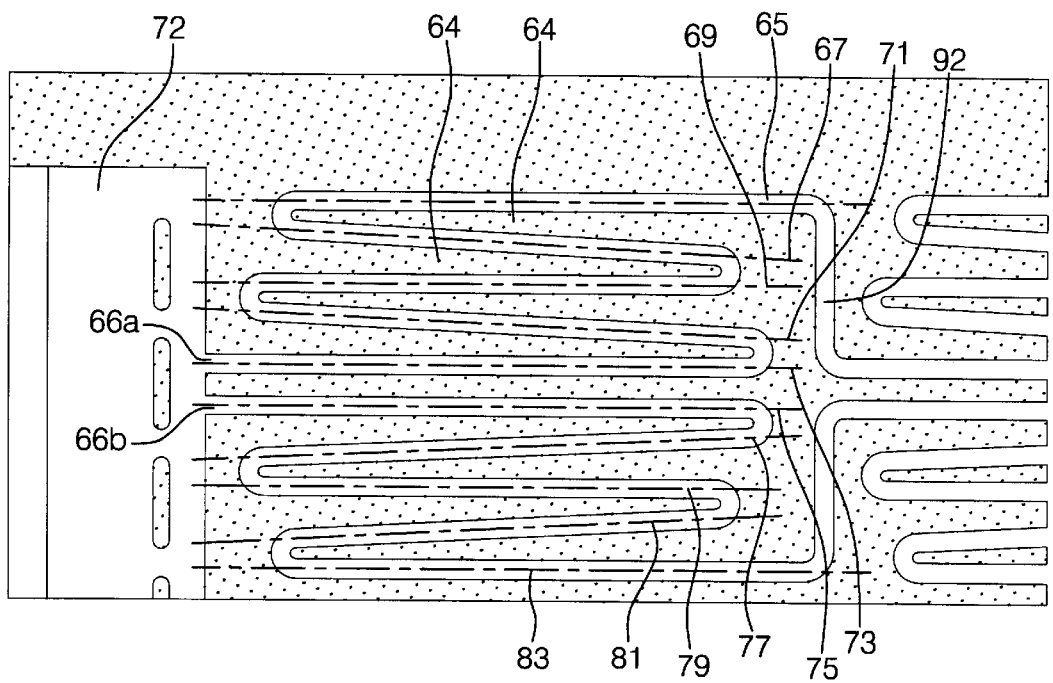
FIG. 5 is an enlarged view of the circled portion of FIG. 4.
Figure 4:
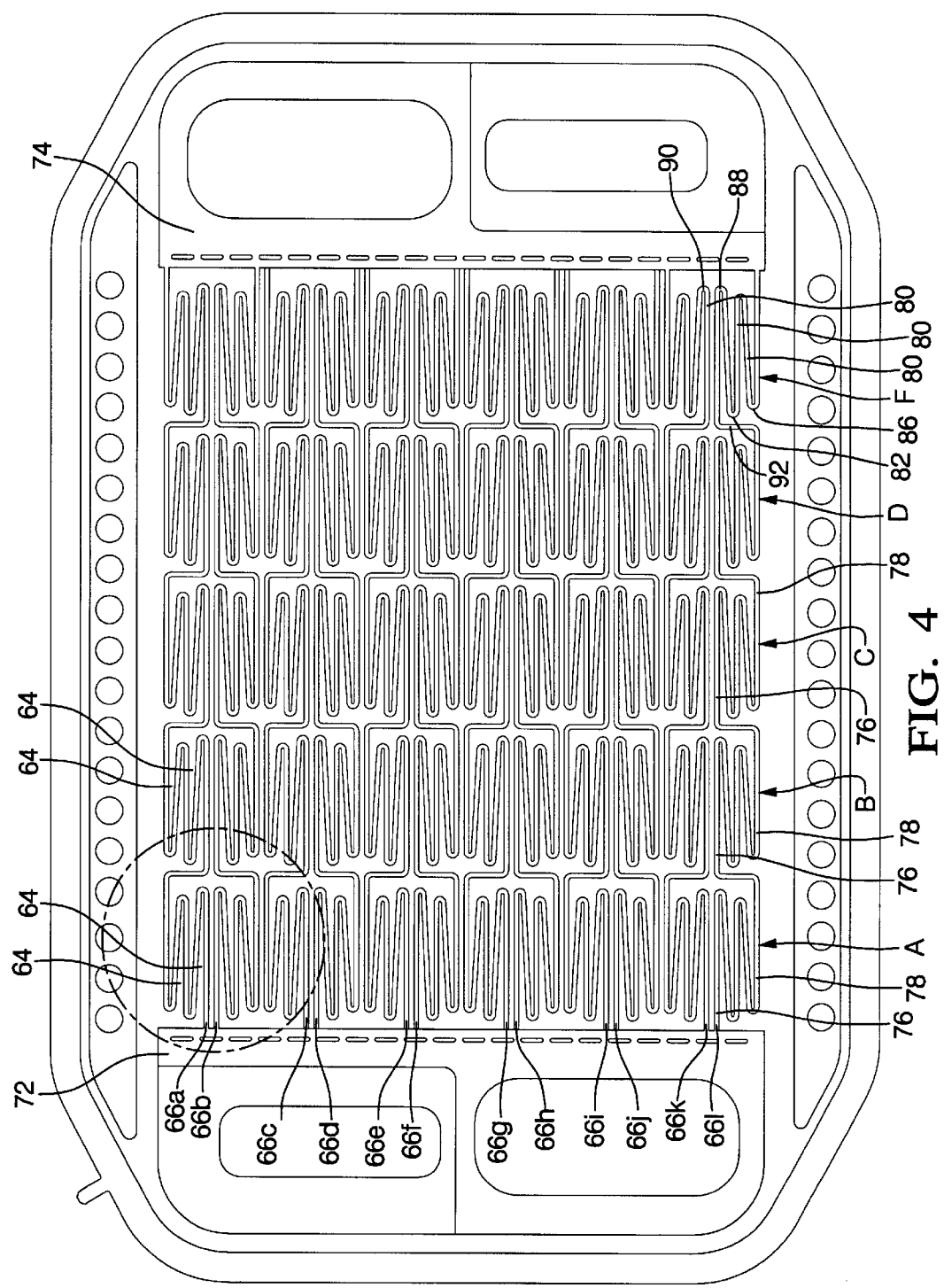
FIG. 4 is a plan view of the bipolar plate of FIG. 2.

FIG. 4 best depicts a flow field configuration in accordance with the present invention coupled with the invention that is the subject of Rock U.S. Pat. No. 6,309,773, assigned to the assignee of the present invention. FIG. 4 is a two dimensional plan view of the plate 58 of FIG. 2. (See also FIG. 5 for a blow-up of the circled portion of FIG. 4). The flow field comprises a plurality of tapering lands 64 defining a plurality of flow channels 66a–66L connected at one end to an inlet supply manifold 72 that distributes a gaseous reactant (e.g. air) to the flow channels 66a–66L, and at the other end to an exhaust manifold 74 for collecting the gaseous reactant exiting the flow channels 66a–66L. Each flow channel 66a–66L comprises a plurality of sectors A–E serially linked to each other, and extending in the general direction between the inlet supply and exhaust manifolds such that gas entering a given channel 66a–66L from the inlet supply manifold 72 flows through all of the serially linked sectors A–E thereof, in sequence until it exits the flow channels 66a–66L into the exhaust manifold 74. Each sector A–E has a serpentine configuration of its own and comprises an inlet leg 76 through which gas flows into a sector A–E, an exit leg 78 through which gas flows out of a sector A–E, and at least one medial leg 80 lying between the inlet and exit legs 76 and 78 respectively. Each leg (i.e. inlet, medial or exit) of a given channel borders at least one other leg of the same channel. The medial legs border two legs of the same channel. Reverse turns 82, 86, 88 and 90 at each end of the medial leg(s) 80 connect that medial leg 80 to the next adjacent leg(s) of the same flow channel whether it be to an inlet leg 76, an exit leg 78 or another medial leg 80. The several legs (i.e. inlet, medial & exit) of each sector are separated one from the next by a tapering land 64 so that adjacent legs converge/diverge on/from each other such that their longitudinal centerlines 65, 67, 69, 71, 73, 75, 77, 79, 81 and 83, as appropriate, intersect each other outboard the channel. The tapered land 64 is widest where the pressure drop between adjacent legs is greatest and narrowest where the pressure drop is least, thereby discouraging untoward trans-land inter-leg short-circuiting of the gas where the pressure drop is greatest.

As shown in FIG. 4, serpentine sector A–E is connected to the next sector in the series by a bridging section 92 that connects the exit leg of a downstream sector to the inlet leg of an upstream sector. In the embodiment shown, the bridging section 92 extends in a direction transverse the general direction that the flow channel extends (i.e. from inlet manifold to exhaust manifold). The reverse-turned ends 82, 86, 88 & 90 of the medial legs each have different spacings from the bridging sections 92, to further discourage short-circuiting thereat as more fully described in Rock U.S. Pat. No. 6,309,773 B1 supra.

Figure 6:
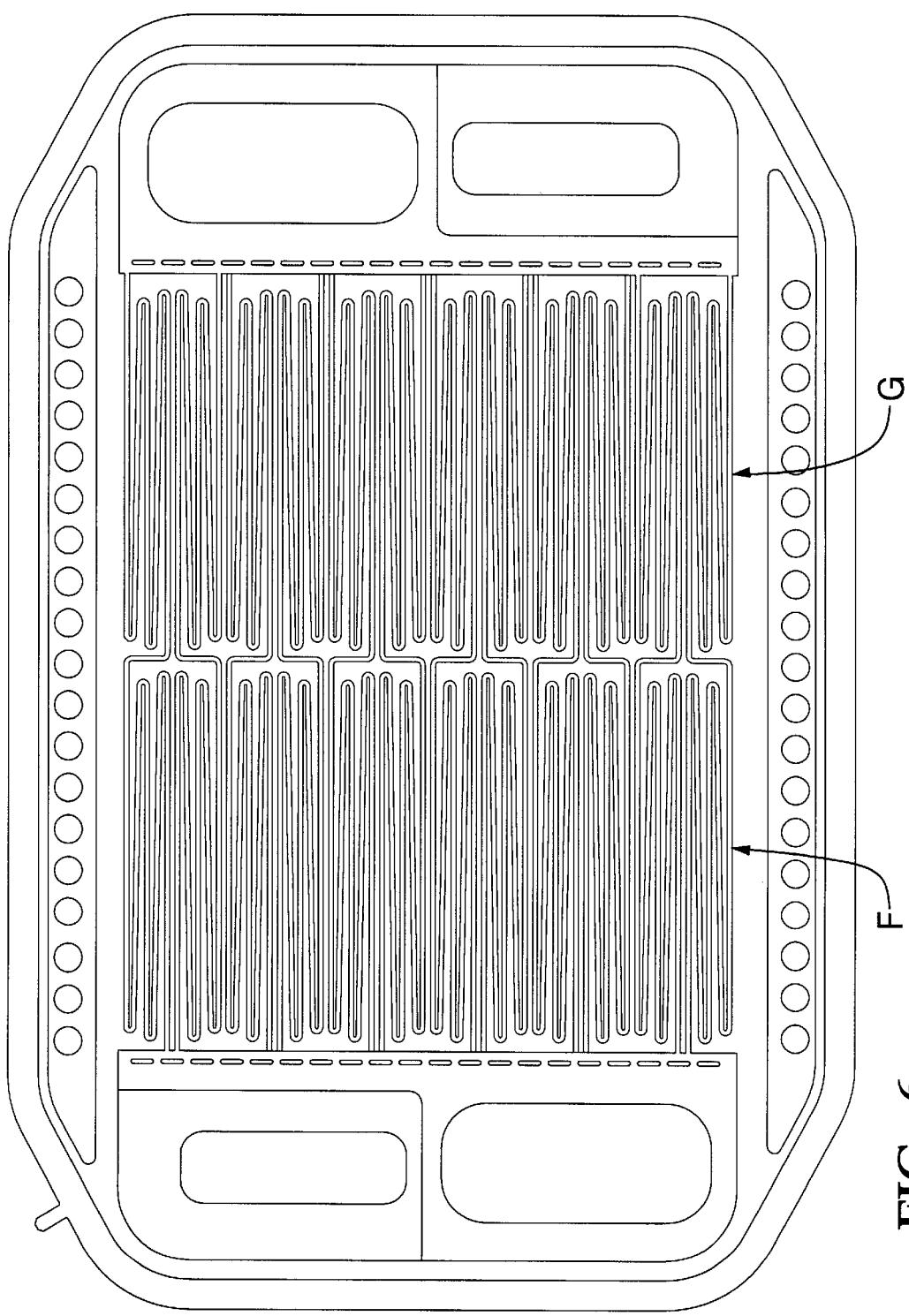
FIG. 6 is a view like that of FIG. 4 showing an alternative embodiment of the present invention.

FIG. 6 depicts another embodiment of the invention wherein each channel has only two serially aligned sectors F and G, rather than the five (A–E) shown in FIG. 4.

Figure 7:
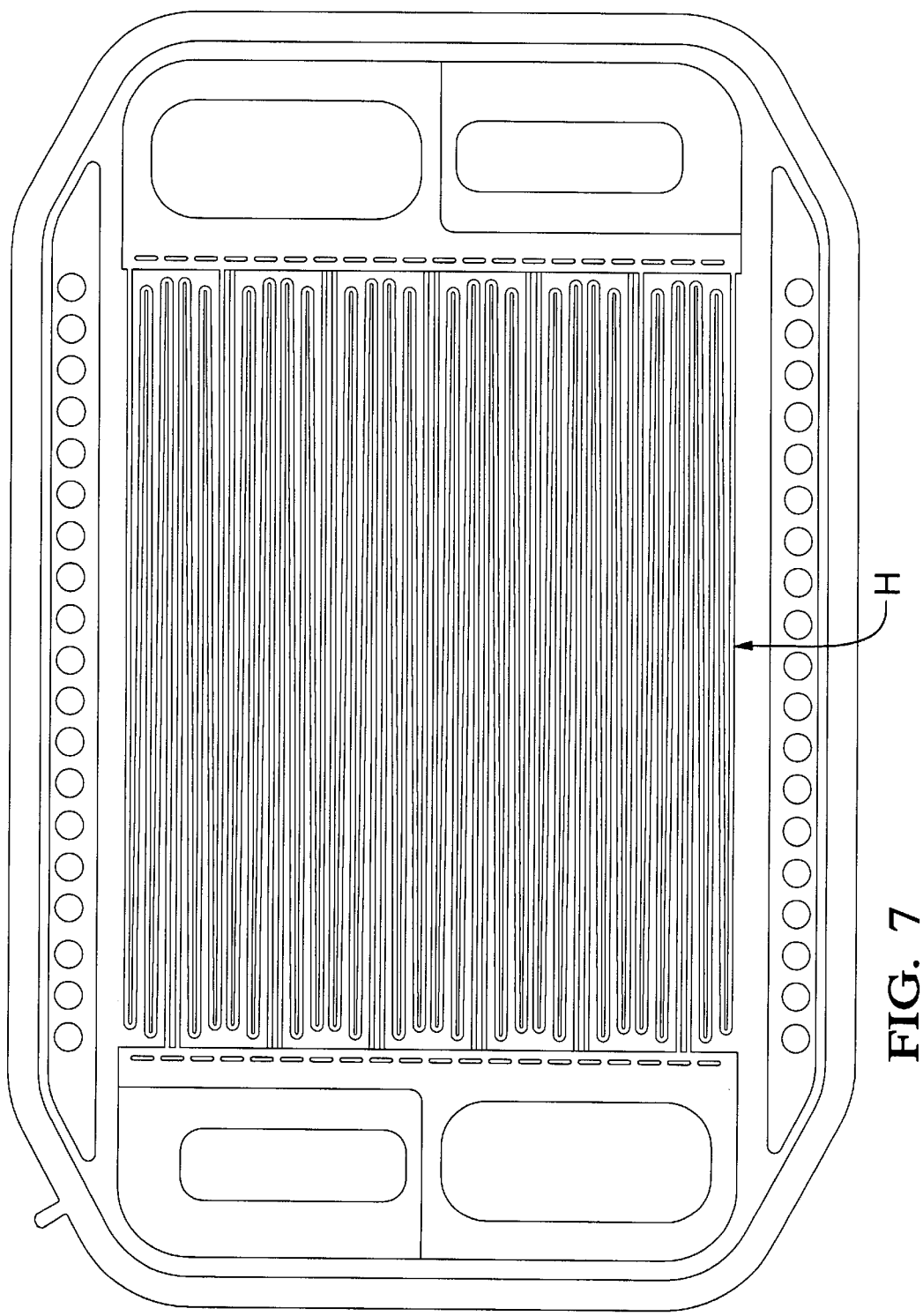
FIG. 7 is a view like that of FIG. 4 showing still another alternative embodiment of the present invention.

Likewise, FIG. 7 depicts still another embodiment of the invention wherein each channel has only a single sector H rather than the multiple sectors shown in FIGS. 4 & 6. Like sectors A–E, sectors F, G, and H all feature the converging/diverging channel legs of the present invention.

While the invention has been disclosed in terms on one specific embodiment thereof, it is not intended that it be limited thereto but rather only to the extent set forth hereafter in the claims which follow.

What is claimed is:

1. In a PEM fuel cell comprising (1) a proton exchange membrane having opposing cathode and anode faces on opposite sides of said membrane, (2) a gas-permeable, electrically conductive cathode current collector engaging said cathode face, (3) a gas-permeable, electrically-conductive anode current collector engaging said anode face, and (4) a current-collecting plate engaging at least one of said gas-permeable cathode and anode current collectors and defining a gas flow field confronting said one gas-permeable collector, said flow field comprising a plurality of lands engaging said one current collector and defining a plurality of serpentine gas flow channels, at least one of said channels comprising at least one serpentine sector flow-communicating a gas supply manifold with a gas exhaust manifold, said sector having an inlet leg for receiving gas into the sector at a first pressure, an exit leg for exhausting said gas from said sector at a second pressure less than said first pressure, at least one medial leg intermediate said inlet and exit legs, said inlet, exit and medial legs each having a longitudinal centerline that intersects the longitudinal centerline of a next adjacent leg of the same channel, and a reverse turn at each end of said medial leg connecting said medial leg to adjacent legs of the same channel.

2. The PEM fuel cell according to claim 1 wherein each said sector includes a plurality of said medial legs intermediate said inlet and exit legs.

3. The PEM fuel cell according to claim 1 wherein said channels each comprise a plurality of serially linked said sectors.

\* \* \* \* \*